United States Patent [19]

Choi

[11] Patent Number: 5,725,812
[45] Date of Patent: Mar. 10, 1998

[54] MELT BLOWING APPARATUS AND METHOD FOR FORMING A FIBROUS LAYERED WEB OF FILTER MEDIA INCLUDING A FLUID DISTRIBUTION ARRANGEMENT

[75] Inventor: Kyung-Ju Choi, Louisville, Ky.

[73] Assignee: AAF International, Louisville, Ky.

[21] Appl. No.: 684,699

[22] Filed: Jul. 22, 1996

Related U.S. Application Data

[63] Continuation-in-part of Ser. No. 677,631, Jul. 8, 1996.
[51] Int. Cl.$^6$ ..................................................... D01D 5/08
[52] U.S. Cl. .............................. 264/6; 264/113; 264/115; 425/7; 425/72.2; 156/167
[58] Field of Search ........................... 264/6, 518, 113, 264/115; 425/7, 72.2; 156/167

[56] References Cited

U.S. PATENT DOCUMENTS

| | | | |
|---|---|---|---|
| 3,825,380 | 7/1974 | Harding et al. | 425/72 |
| 3,942,723 | 3/1976 | Langdon | 239/135 |
| 4,116,738 | 9/1978 | Pall | 156/167 |
| 5,080,569 | 1/1992 | Gubernick et al. | 425/7 |
| 5,248,247 | 9/1993 | Rubhausen et al. | 425/66 |
| 5,618,566 | 4/1997 | Allen et al. | 425/7 |

*Primary Examiner*—Mary Lynn Theisen
*Attorney, Agent, or Firm*—Polster, Lieder Woodruff & Lucchesi

[57] ABSTRACT

An apparatus and method for distributing pressurized fiber attenuating fluid through a melt blowing multi-headed die body uniformly and contaminant filtered with a minimum of energy loss before reaching the fluid attenuating outlets of the die body.

14 Claims, 5 Drawing Sheets

MELT BLOWING APPARATUS AND METHOD FOR FORMING A FIBROUS LAYERED WEB OF FILTER MEDIA INCLUDING A FLUID DISTRIBUTION ARRANGEMENT

BACKGROUND OF THE INVENTION

The present invention relates to a method and apparatus for melt blowing systems and more particularly to an improved, highly efficient, low energy melt blowing die apparatus and process having a unique capability of uniformly introducing attenuating fluid streams into a melt blowing die with a comparative minimum of energy and with a minimum of contaminant particles. This application constitutes a continuation-in-part of U.S. patent application Ser. No. 08/677,631, filed on Jul. 8, 1996 by Kyung-Ju Choi.

Non woven fiber mats formed by melt blowing dies and melt blowing processes for producing the same have been long known in the prior art. In this regard, attention is directed to the expired U.S. Pat. No. 3,825,380, issued to J. W. Harding et al on Jul. 23, 1974, which teaches the formation of such a fibrous mat from molten polymers by means of a longitudinally extending single die head apparatus having a triangular cross-sectional die nose configuration with a pair of oppositely directed attenuating air streams being directed along the die nose flanks toward centrally emitted melt blown fibers with the air streams flowing in opposed angular direction so as to include an angle therebetween in the range of thirty (30) to ninety (90) degrees, it being noted that the attenuated elongated fiber streams are cooled ambiently before collection on a screen as a web and that the attenuating fluid (FIG. 1) is introduced into the single die head along the side thereof and normal to the melt stream flow from such single die head. In U.S. Pat. No. 3,942,723 issued to Roy A. Langdon on Mar. 9, 1976 and U.S. Pat. No. 4,116,738, issued to David B. Pall on Sep. 26, 1978, still another single die head structure is disclosed in each of these patents, such as is disclosed in a number of other prior art patents, only in these patents and in a few others to be found in the prior art disclosing single die head structure—none of which are specifically noted herein in the interest of avoiding undue prolixity—an attenuating fluid stream can be seen as introduced into a single die head source from a position substantially opposite the melt stream flow. Further, in U.S. Pat. No. 5,080,569, issued to David Gubernick et al on Jan. 14, 1992, a comparatively complex diverter device is disclosed to obtain a uniform flow of an attenuating fluid stream in a single head die structure.

Although the prior art teaches or suggests various overall die structures, die tip fluid material feeding structure and melt blowing processes, none teaches the unique and novel die construction and melt blowing process for introducing fluid attenuating streams into multi-headed die arrangements as is described herein.

In accordance with the novel features of the present invention, a straightforward, economical, easy to manufacture, easy to assemble and to maintain apparatus is provided, as is a unique melt blowing process requiring a straightforward and economical series of steps which provides an increase in fibrous filter media output with a minimum of both structure and energy consumption. In addition the present invention allows for straightforward and economical modifications in the novel apparatus and process to produce varying sizes and varying characteristic filter fibers in accordance with varying market demands.

Various other features of the present invention will become obvious to one skilled in the art upon reading the disclosure set forth herein.

BRIEF SUMMARY OF THE INVENTION

More particularly the present invention provides a die apparatus for forming a layered web of fibrous filter media comprising: a unitary die body having inlet and outlet faces formed from a preselected heat conductive material, the die body having formed therein at least two preselectively spaced fluid material flow-through passages, each fluid material flow-through passage having a fluid material receiving inlet and a fluid material dispensing outlet adapted to dispense a row of layer forming fibers from the outlet face of the die body with the dispensed fiber layers to be collected in stacked, facing, relation, the die body further having formed therein spaced fluid attenuating passages, each fluid attenuating passage having a fluid attenuating inlet and a fluid attenuating outlet with each fluid attenuating outlet being cooperative with a fluid material dispensing outlet on the outlet face of the die body; and, a fluid attenuating uniform distribution assembly means cooperatively positioned to extend longitudinally in spaced relation opposite the outlet face of the die body to cooperatively communicate with the spaced fluid attenuating passages in the die body, the distribution assembly means including elongated first fluid manifold means connected to a pressurized fluid source and disposed in spaced relation in an elongated second fluid manifold means to provide an annular fluid mixing chamber means therebetween, the first fluid manifold means having fluid outlet means disposed therealong to distribute fluid uniformly to the annular fluid mixing chamber means, the second fluid manifold means cooperatively communicating with the fluid attenuating passages in the die body.

Further, the present invention provides a method of distributing pressurized fiber attenuating fluid to a melt blowing die body comprising: passing pressurized fluid into a first elongated chamber externally of and opposite the fluid outlets of the melt blowing die body; distributing the pressurized fluid uniformly from the first elongated chamber into a second mixing chamber surrounding the first chamber and passing the pressurized fluid to the melt blowing die body.

It is to be understood that various changes can be made by one skilled in the art in one or more of the process steps and in one or more of the several parts of the die apparatus disclosed herein without departing from the scope or spirit of the present invention.

BRIEF DESCRIPTION OF THE DRAWINGS

Referring to the drawings which schematically disclose one advantageous embodiment of the present invention.

DETAILED DESCRIPTION OF THE INVENTION

Figure 1:
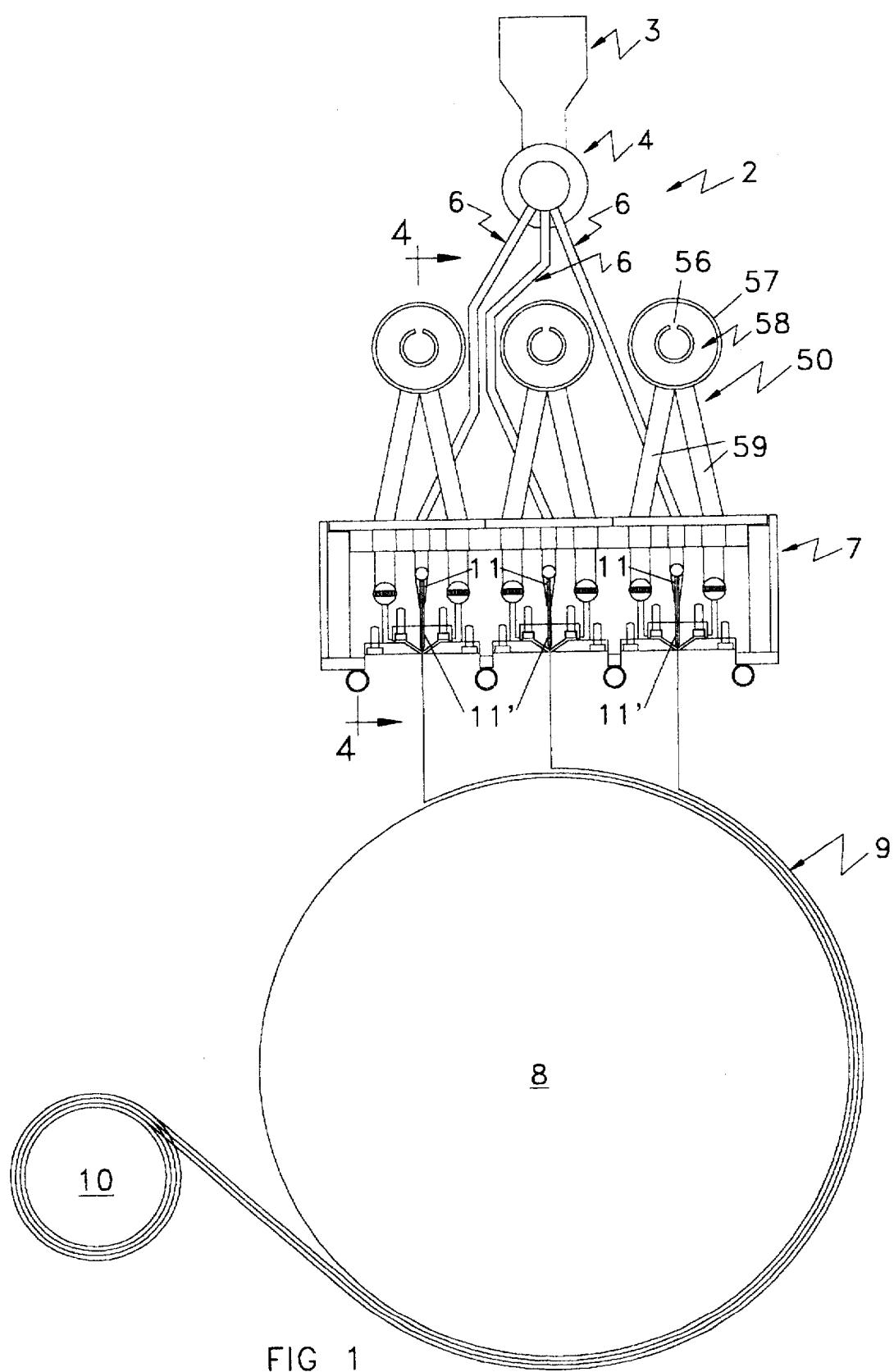
FIG. 1 is a schematic cross-sectional view of the overall structure incorporating the inventive unitary melt blown die body and a drum collector and winder positioned in spaced relation therebelow to receive and collect melt blown fibrous layers in a facing layer-upon-layer web, all as disclosed in the parent application, further disclosing the inventive structural arrangement for introducing attenuating fluid streams uniformly into the multi-headed melt blown die.

Referring to FIG. 1 of the schematic drawings, a spinning assembly 2 is schematically disclosed as including a fluid material feed hopper 3, a motor driven (not shown) extruder 4, fluid material feeder conduits 6, the inventive unitary die body 7 and a spaced fibrous web rotating drum collector 8 for collecting the novel layered fibrous web 9 thereon to be fed to winder 10, the overall spinning assembly 2 including a feed hopper, extruder, feeder conduits, die body, collector—either of drum or endless belt type—and winder being generally known in the art. FIG. 1 further discloses the inventive structural arrangement 50 for introducing attenuating fluid streams uniformly into the die body 7.

Referring to the schematic arrangement of FIGS. 2–5 of the drawings, details of the inventive features of the novel die apparatus and process for forming the novel layered web of fibrous filter media 9 can be seen in detail, as well as the novel fluid attenuating arrangement 50. In accordance with the present invention, longitudinally extending unitary die body 7 can be formed as such unitary die body member (FIG. 3) from a suitable, preselected heat conducting material, such as a nickel-chromium steel, it being understood that other types of suitable, readily formed, heat conductive materials also could be utilized. Unitary longitudinally extending die body 7 has formed therein, either by precision casting or precision drilling, a plurality of preselectively spaced fluid material flow-through slotted material passages 11, three such slotted material passages being shown in the drawings. In order to provide for a final layered product, it is to be understood that at least two such slotted fluid material flow-through passages are required in the longitudinally extending, unitary die body with the spacing of the slotted material passages 11 being compatible with the geometry and size of drum 8 or an endless belt collector (not shown). Each fluid material slotted passage 11 has a fluid material receiving inlet 12 to be connected to the aforedescribed feed hopper 3, extruder 4 and one of feeder conduits 6 disposed externally of unitary die body 7. Each fluid material slotted passage 11 is further provided with a fluid material slotted dispensing outlet 13, which outlet is located in the communicating removable nose section as described more fully hereinafter. The longitudinally extending unitary die body 7 further is provided with pairs of oppositely disposed rows of spaced fluid attenuating flow-through passages 14 with one pair of opposed rows of spaced attenuating passages 14 serving the opposite sides of each fluid material slotted flow-through passage 11 in die body 7. Like slotted flow-through material passages 11, each pair of rows of spaced passages 14 serving as oppositely disposed slotted fluid attenuating passages can be formed in unitary die body 7 by precision casting or precision drilling. Each spaced fluid attenuating flow-through passage 14 of each pair of spaced rows is provided with a fluid attenuating manifold inlet 16 connected to the novel and unique fluid distribution arrangement 50 as described in detail hereinafter. As also is described more fully hereinafter, opposed fluid attenuating outlet pairs 17 (FIG. 2) are formed by the flanks of a removable, longitudinally extending nose section of triangular cross-section and one pair of oppositely disposed and spaced mirror-image removable longitudinally extending lip sections.

Figure 2:
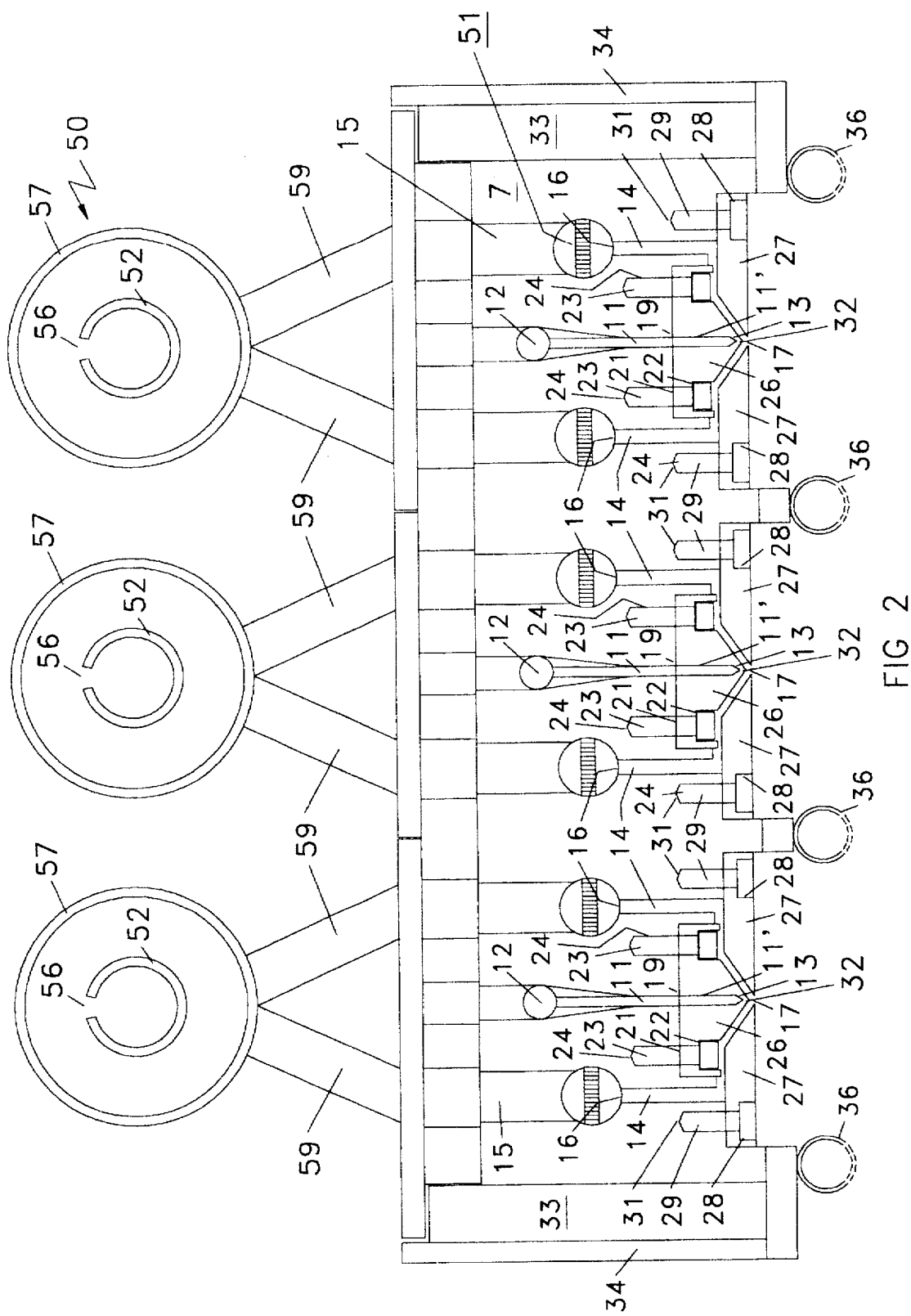
FIG. 2 is an enlarged cross-sectional view of the novel die body structure of FIG. 1 with the inventive die structural arrangement of modified FIG. 1.
Figure 3:
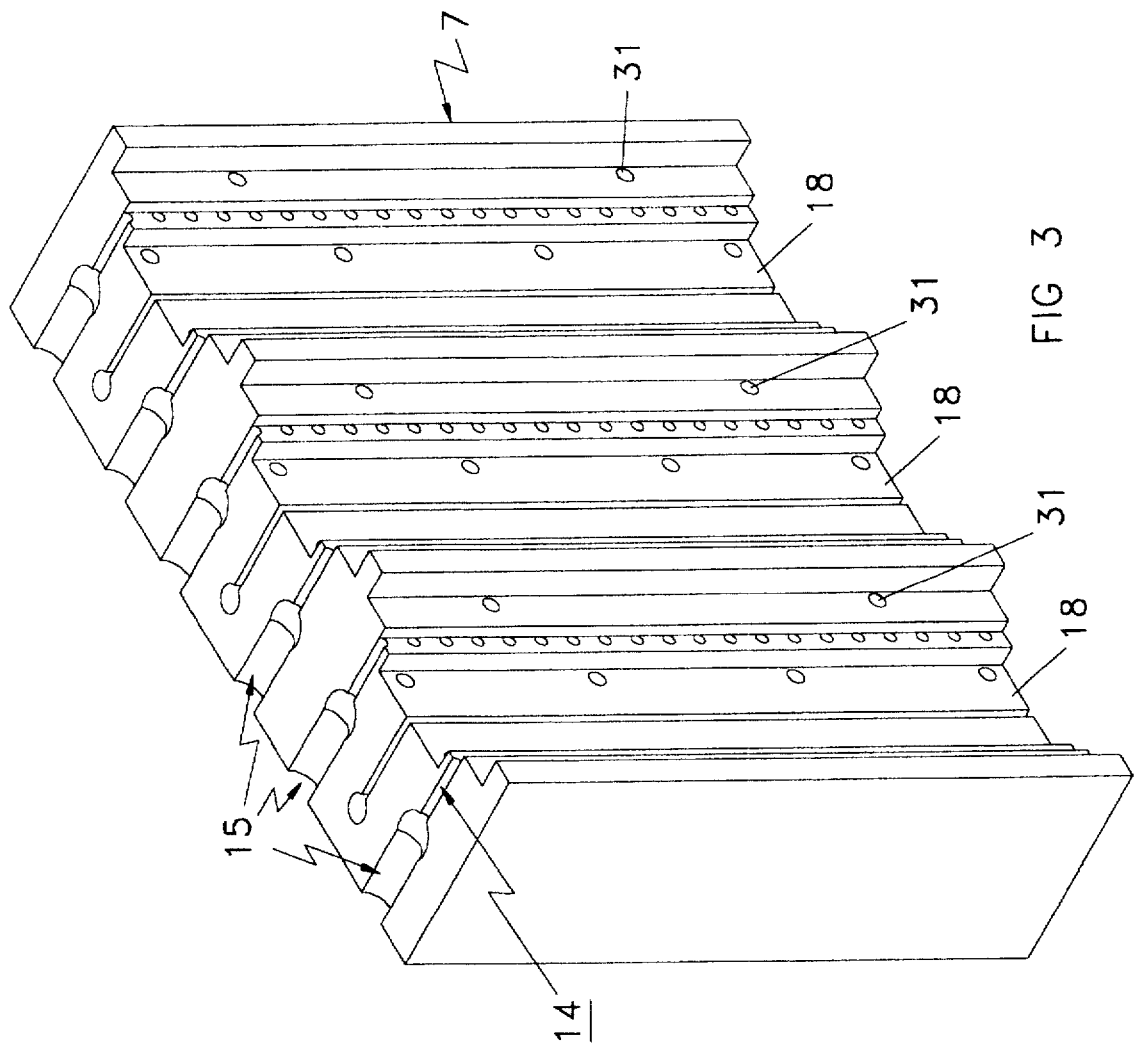
FIG. 3 is an isometric view of the unique die body disclosed in FIGS. 1 and 2 as modified with the spaced, removable nose sections and fluid passage lip sections of FIGS. 1 and 2 removed.

Referring particularly to FIG. 3 of the drawings, it can be seen that one side of longitudinally extending unitary die body 7, is provided with three longitudinally extending, cross-sectionally stepped recesses 18. Each of these longitudinally extending stepped recesses 18 serves to snugly receive in nesting relation the longitudinally extending base portion 21 of a longitudinally extending nose section 19 (FIG. 2), which nose section 19 also can be formed as a single, unitary piece from a suitable heat conductive material such as nickel-chromium steel similar to the material of unitary longitudinally extending unitary die body 7. Each longitudinally extending nose section 19 is appropriately provided with a plurality of spaced taps 22 through the longitudinally extending side wing portions of longitudinally extending nose section 19 to receive in nesting relation the heads of fastening screws 23 which engage in the spaced taps 24 in longitudinally extending unitary die body 7 all as shown in FIG. 2 of the drawings.

As also can be seen in FIG. 2 of the drawings, each longitudinally extending nose section 19 is so formed as to provide a longitudinally extending apex portion 26 extending from nestable base portion 21, this apex portion 26 also is centrally longitudinally slotted as at 11' so as to mate with and provide a communicating continuation of longitudinally extending fluid material dispensing slot 11 in longitudinally extending unitary die body 7 with the fluid material outlet 13 of slot 11' being adjacent the apex of the nose section to cooperate with an orificed longitudinally extending spinnerette plate mounted at the apex of longitudinally extending nose section 19 (described hereinafter).

It is to be noted that longitudinally extending apex portion 26 of longitudinally extending nose section 19 is of triangular cross-section with the included angle defining the apex of the cross-sectional triangle being preselectively in excess of ninety-five (95) degrees. It is recognized that the nose section thickness and strength to prevent cracking near the tip vicinity of the nose section orifice increases as the included angle increases.

In accordance with the present invention the included angle of the triangular cross-section is selectively in the range of approximately ninety-five (95) degrees to one hundred and twenty (120) degrees and advantageously is approximately one hundred and eight (108) degrees plus or minus two (2) degrees. Since the oppositely and inwardly sloping side flanks of the longitudinally extending apex portion 26 of longitudinally extending nose section 19 each serve as one defining wall of the opposed terminal portion of fluid attenuating passages 14 and the cooperating parallel and chamfered spaced edge end faces of opposed mirror-image longitudinally extending removable lip sections 27 serve as the other defining walls of the terminal portions of passages 14, the defined fluid attenuating outlets 17 are so angularly positioned on opposite sides of fluid material outlets 13 as to be more in opposition to each other to provide a turbulent pulse-like, sinusoidal attenuating fibrous flow from each of fluid material outlets 13 to thus increase the rate of fibrous layer attenuation from each outlet 13 in accordance with one feature of the present invention. In accordance with still another feature of the present invention, the removable longitudinally extending lip sections 27, as can be seen in FIG. 2, are each provided with longitudinally spaced, tapped recesses 28 adjacent the side opposite the chamfered end edge of each of the opposed lip sections. These tapped recesses 28 serve to receive the heads of fastening screws 29, which like screws 23, engage in spaced taps 31 of unitary die body 7 to hold the removable lip section pairs 27 in fast passage defining position. It is to be understood that the spacing and geometric configuration of the lip sections 27 can be varied to determine the velocity and angle of the fluid attenuating stream.

As disclosed in the parent application, the cross-section of each of the longitudinally extending slot type fluid material flow-through passages 11 is formed in unitary die body 7 in a hanger type shape, such a hanger-type shape for fluid material passages being long known in the art. As aforedescribed elongated, slotted passages 11 communicate with passages 11' in nose sections 19 when they are removably mounted in the stepped recess 18 of the unitary die body 7. Formed in the apex portion 26 of each nose section 19, also in a manner known in the art, is an orifice plate, as described in the parent application.

Each orifice plate includes at least one row of spaced fibrous fluid emitting apertures therein. In accordance with still another feature of the parent invention, these spaced apertures advantageously number approximately thirty (30) per inch, each being preselectively sized and geometrically shaped to determine the size and cross-sectional shape of the layered fibrous material passing therethrough. It is to be understood that like lip section pairs 27, the nose sections 19 can be readily replaced with other type lip and nose sections having differing designs including but not limited to geometrically differing orifice arrangements and sizes.

Referring once again to FIG. 2 of the drawings, it can be seen that unitary die body 7, can advantageously be provided with an aluminum alloyed, electric coil heating jacket 33 cooperatively surrounding the unitary die body 7 to conduct heat to fluid passages 11 and 14 therein. A suitable ceramic insulating jacket 34 cooperatively surround the outer face of heating jacket 33. It is to be understood that the present invention is to be considered as not limited to the specific heating and insulating arrangements as shown but that other heating and insulating arrangements can be employed without departing from the scope or spirit of the invention disclosed herein.

In accordance with still another feature of the parent invention, as can also be seen in FIG. 2, spaced, apertured fluid conduits 36 can be fastened to the unitary die body 7 to be cooperative along opposite sides of each fluid material dispensing outlet 13 at the apex of nose section 19 and opposed lip sections 27 to treat emitted layered fibrous material with a solidifying, cooling fluid such as blower driven cool or ambient air. Such a solidifying treatment serves to avoid subsequent bonding of collected adjacent facing fibrous layers and to reduce the bonding of individual fibers within each layer to thus increase media bulk with accompanying increased dust holding capacity and overall efficiency.

In carrying out the inventive process for forming a layered web of fibrous filter media wherein adjacently facing layers of fibrous filter media are distinctly separate from each other, polymer filter media fibers are sequentially fed in heated form,—all as described in the parent application—the polymer media advantageously having a viscosity in the range of at least ten (10) to three hundred (300) poise. The polymer is fed from at least two and advantageously several preselected spaced heated melt blown die source orifice rows as fiber forming layers with at least ten (10) to fifty (50) fibers per inch and advantageously and at least approximately thirty (30) fibers per inch with the fibers having been heated in the melt blown die sources to a temperature within the approximate range of four hundred (400 F) to nine hundred (900 F) degrees Fahrenheit. The output of melt blown material per each orifice of a die source orifice row advantageously is in the range of zero point one (0.1) to two point eight (2.8) grams per minute. The fibers attenuated from the orifice rows of each die source advantageously can have a diameter in the range of zero point three (0.3) to twenty (20) micrometers in diameter and the polymer material can be but is not limited to polyester having a density of approximately one point four (1.4) grams per cubic centimeter, a polypropylene having a density of approximately zero point nine (0.9) grams per cubic centimeter or a nylon having a density of approximately one point one four (1.14) grams per cubic centimeter.

In accordance with one feature of the parent invention of the parent application, the emitted fibers from each row of spaced orifices are attenuated by pairs of oppositely directed fluid air stream advantageously at a rate of up to six hundred (600) feet per second, the air streams advantageously being heated to a temperature of approximately seven hundred (700 F) degrees Fahrenheit. These oppositely directed air streams are so angularly directed as to include an angle between opposed streams in excess of approximately ninety-five (95) degrees, desirably within an approximate range of ninety-five (95) to one hundred twenty (120) degrees and advantageously at one hundred eight (108) degrees plus or minus two (2) degrees. This angular direction of the opposed attenuating fluid streams serves to provide a turbulent fiber flow, increasing the rate of fiber attenuation. In accordance with still another feature of the present invention, a cooling treatment of the attenuated fibers with cool air is applied to either side of each of the layer rows of fibers at the fiber attenuation location in order to enhance crystallization before the fibers are collected in face-to-face layered form on a collector, such as a revolving drum or endless belt. This treatment serves to avoid bonding between adjacent layer faces and to reduce fiber bonding within each layer so as to increase filter media bulk with accompanying increased dust holding capacity and overall efficiency.

In accordance with still another feature of the invention of the parent application, a unique and novel filter media is produced by the apparatus and method described herein, such unique filter media includes a layered fibrous fluid filter media web of melt blown fibrous material comprising at least two or more freely separable face to face melt blown layers of fibrous filter media free of layer bonding with the fibers in each layer having a minimum bonded relation to provide a fibrous filter media of maximized bulk with accompanying increased dust holding capacity and increased overall efficiency. The fibers of such novel filter media advantageously can be in the range of zero point three (0.3) to twenty (20) micrometers in diameter and can be of polymeric nature of either a polyester with a density of approximately one point four (1.4) grams per cubic centimeter or a polypropylene with a density of approximately zero point nine (0.9) grams per cubic centimeter or a nylon with a density of approximately one point one four (1.14) grams per cubic centimeter.

Figure 4:
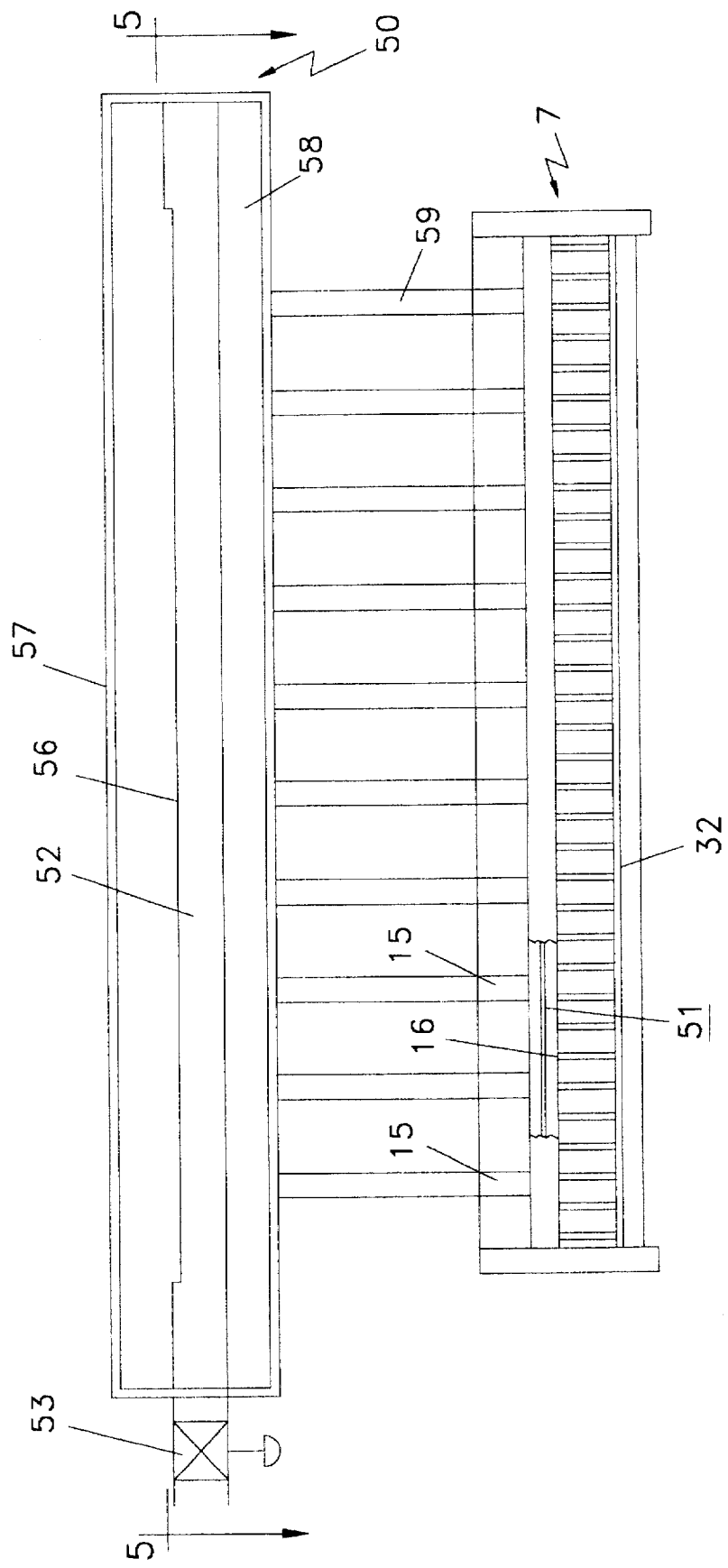
FIG. 4 is a schematic cross-sectional view taken in a plane through line 4—4 of FIG. 1, disclosing in longitudinal form the fluid attenuating feed structure in cooperation with removable air lip sections; and, FIG. 5 is a cross-sectional, slightly reduced view taken through the line 5—5 of FIG. 4 disclosing further details of the manifold assembly for feeding the fluid attenuating streams to the three die heads of the multi-headed melt blown die structure as disclosed in FIG. 3 of the drawings.
Figure 5:
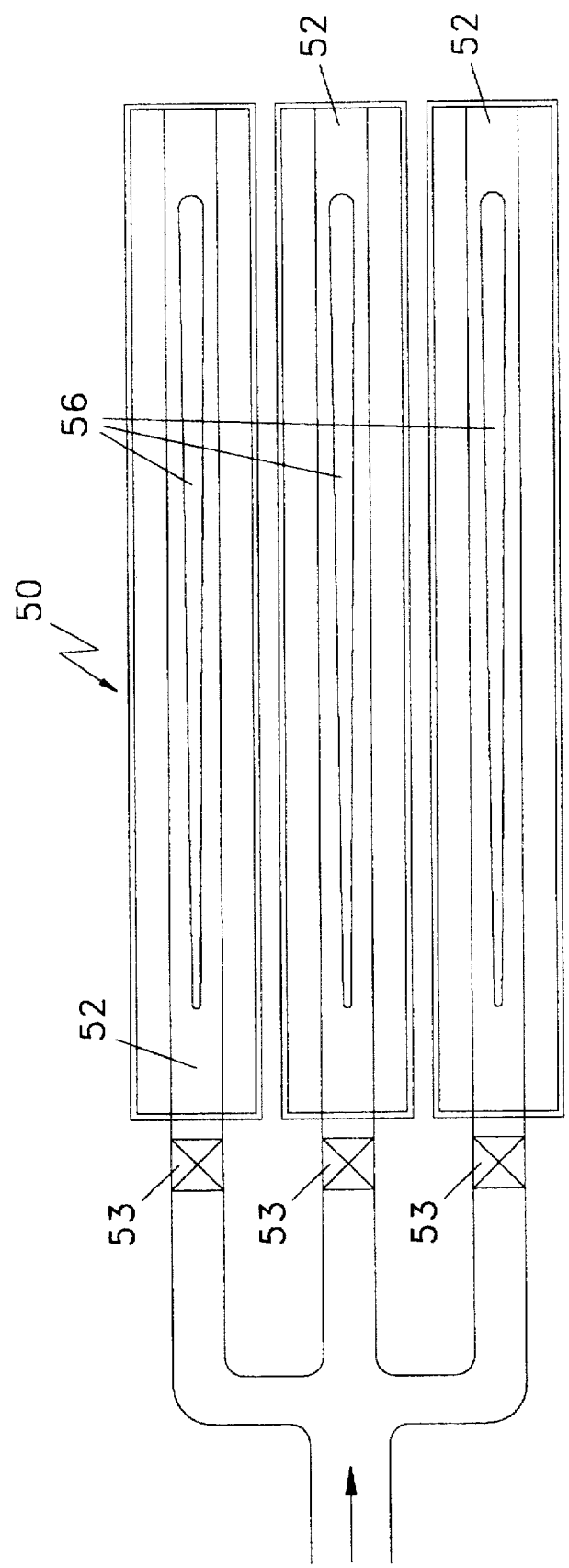

Referring To FIGS. 1, 2, 4 and 5 of the drawings and particularly to FIGS. 4 and 5, the inventive aforementioned fluid attenuating distribution assembly 50 of the present disclosure shows a portion thereof positioned externally of die body 7 to extend longitudinally in spaced relation opposite the outlet face of die body 7, distribution assembly 50 cooperatively communicating with the flow-through fluid attenuating passages 14 in die body 7 and, in turn, with fluid attenuating outlet pairs 17 aforedescribed through the longitudinally extending fluid attenuating manifolds 16 disposed internally of die body 7 with manifolds 16 (FIG. 2) being connected to fluid attenuating flow-through passages 14. It is to be noted that each of manifolds 16 has disposed therein an elongated, removable fluid filter or strainer 51. The filters or strainers 51 serve to enhance uniform parallel flow and to separate contaminant particulates from introductory attenuating fluids through spaced passages 15 prior to passage of such fluids to passages 14 connected to manifolds 16.

As can be seen in FIGS. 1,2,4 and 5 of the drawings and particularly FIGS. 4 and 5, a portion of distribution assembly 50, longitudinally extends in spaced relation from die body 7 and opposite the fluid attenuating outlet pairs 17 and the fluid material outlets 13. As can be seen in FIGS. 4 and 5, this includes a set of at least two parallel, spaced first manifolds 52 with three such manifolds 52 being disclosed in FIG. 5 to serve the three spaced die heads in unitary die body 7. Each of external manifolds 52 is connected through a control valve 53 by a distribution manifold 54 to a common pressurized fluid source. Advantageously, this source and the distribution assembly 50 can be so sized as to be capable of delivering attenuating fluid to die body 7 at a rate of up to six hundred (600) feet per second to be heated in die body 7 to a temperature of approximately nine hundred (900F) degrees Fahrenheit before dispensing through fluid attenuating outlet pairs 17 in die body 7.

In accordance with one feature of the present invention and as can be seen in FIGS. 4 and 5 of the drawings, each first distribution manifold 52 is provided with an elongated tapered slot 56 which tapers outwardly from the inlet of manifold 52 toward the opposite end of the manifold and away from and advantageously facing opposite connecting conduits 59 described hereinafter. It is to be understood that the specific overall area of slots 56 and the angle of taper can be varied in accordance with the pressure and amount of fluid to be delivered by the fluid attenuating distribution assembly 50. The tapered slots 56 serve to uniformly deliver attenuating fluid such as pressurized air to a set of second manifolds 57, each spacedly surrounding a manifold 52 to provide an annular fluid mixing chamber 58 therebetween to receive and mix fluid emitted uniformly from tapered slot 57 in manifold 52. Each surrounding manifold 57 is connected to a set of connecting conduits which lead to the face of die body 7 opposite that face of die body 7 having the fluid attenuating outlets 17 and the material outlets 13. Connecting conduits 59 which can be flexible, are in turn connected with passages 15 which are connected to distribution manifolds 16 in which removable elongated fluid strainers 51 are disposed, manifolds 16, in turn, being connected to aforedescribed attenuating fluid flow-through passages 14 and ultimately to attenuating fluid outlet pairs 17. It also is to be understood that although a portion of distribution assembly 50 is disclosed as being outside die body 7 and a portion within die body 7, it would be possible to dispose most of the distribution assembly 50 either externally of or included within die body 7.

In accordance with the invention as described herein, the inventive steps of the present application include passing pressurized attenuating fluid such as air into a first elongated chamber externally of and opposite the fluid outlets of a melt blowing die body; distributing the pressurized fluid uniformly from the first elongated chamber into a second mixing chamber which can advantageously surround the first chamber and passing the pressurized fluid to the melt blowing die body. This novel method can further include the steps of straining contaminant particulates from the attenuating fluid either externally or within the melt blown die with the first chamber being surrounded by a second mixing chamber and with the rate of fluid delivery at six hundred (600) feet per second and at temperatures up to nine hundred (900F) degrees Fahrenheit.

The invention claimed is:

1. Die apparatus for forming a layered web of fibrous filter media comprising: a unitary die body having inlet and outlet faces formed from a preselected heat conductive material, said die body having formed therein at least two preselectively spaced fluid material flow-through passages, each fluid material flow-through passage having a fluid material receiving inlet and a fluid material dispensing outlet adapted to dispense a row of layer forming fibers from said outlet face of said die body with the dispensed fiber layers to be collected in stacked, facing, relation, said die body further having formed therein spaced fluid attenuating passages, each fluid attenuating passage having a fluid attenuating inlet and a fluid attenuating outlet with each fluid attenuating outlet being cooperative with a fluid material dispensing outlet on said outlet face of said die body; and, a uniform fluid attenuating distribution assembly means cooperatively positioned to extend longitudinally in spaced relation opposite said outlet face of said die body to cooperatively communicate with said spaced fluid attenuating passages in said die body, said distribution assembly means including elongated first fluid manifold means connected to a pressurized fluid source and disposed in spaced relation in an elongated second fluid manifold means to provide an annular fluid mixing chamber means therebetween, said first fluid manifold means having fluid outlet means disposed therealong to distribute fluid uniformly in a preselected direction to said annular fluid mixing chamber means, said second fluid manifold means cooperatively communicating with said fluid attenuating passages in said die body.

2. The die apparatus of claim 1, said fluid attenuating distribution assembly means positioned externally of said die body.

3. The die apparatus of claim 1, said fluid attenuating distribution assembly means including elongated fluid strainer means disposed therein to enhance uniform parallel flow and to separate contaminant particles from fluid prior to passage to said fluid attenuating passages in said die body.

4. The die apparatus of claim 1, said first fluid manifold means comprising at least two spaced elongated first fluid manifolds connected to a common pressurized fluid sources each first fluid manifold being disposed in spaced relation in one of at least two second fluid manifolds to provide at least two spaced fluid annular mixing chambers.

5. The die apparatus of claim 1, said fluid outlet means in said first fluid manifold means being in the form of an elongated slot extending from one end of said first manifold to the opposite end thereof and being preselectively tapered and positioned to deliver fluid uniformly to said annular fluid chamber means.

6. The die apparatus of claim 1, said die apparatus being sized to deliver fluid attenuating streams at the outlet face of said die body at a rate of up to six hundred (600) feet per second.

7. The die apparatus of claim 1, said die apparatus including heating means to heat said fluid attenuating streams to approximately nine hundred (900F) degrees Fahrenheit.

8. Die apparatus for forming a layered web of fibrous filter media comprising: a heated unitary die body having inlet and outlet faces formed from a preselected heat conductive material, said die body having formed therein at least two preselectively spaced fluid material flow-through passages, each fluid material flow-through passage having a fluid material receiving inlet and a fluid material dispensing outlet adapted to dispense a row of layer forming fibers from said outlet face of said die body with the dispensed fiber layers to be collected in stacked, facing, relation, said die body further having formed therein spaced fluid attenuating passages, each fluid attenuating passage having a fluid attenuating inlet and a fluid attenuating outlet with each fluid attenuating outlet being cooperative with a fluid material dispensing outlet on said outlet face of said die body; and, a uniform fluid attenuating distribution assembly means, a portion of which is cooperatively positioned externally of said die body to extend longitudinally in spaced relation opposite said outlet face of said die body to cooperatively communicate with said spaced fluid attenuating passages in said die body, said distribution assembly means including an elongated internal fluid manifold disposed in said die body to communicate with said fluid material flow-through passages in said die body, said internal distribution manifold having an elongated removable fluid strainer disposed therein to enhance uniform parallel flow and to separate contaminant particulates from fluid prior to passage to said flow-through passages, said portion of said distribution assembly means externally of said die body including a set of at least two parallel, spaced first manifolds connected to a common pressurized fluid source to ultimately deliver fluid to said die body at a rate of up to six hundred (600) feet per second and to be heated to a temperature of approximately nine hundred (900F) degrees Fahrenheit before dispensing through said fluid passage outlets in said die body, each of said first set of manifolds having an elongated tapered slot to emit said pressurized fluid uniformly in a preselected direction therefrom, and a set of at least two elongated second manifolds externally of said die body, each spacedly surrounding said first manifolds to provide an annular mixing chamber to receive and mix fluids emitted uniformly and preselectively directed from said tapered slots in said first manifolds, said external second manifolds being communicatively connected to said interior fluid manifold disposed in said die body.

9. Die apparatus for forming a layered web of fibrous filter media with the layers thereof distinctly separate from each other comprising: a unitary die body formed from a heat conductive nickel-chromium alloyed steel, said die body having inlet and outlet faces and having formed therein several fluid material flow-through passages, each fluid material flow-through passage having a fluid material receiving inlet to be connected to a fluid material supply source externally of said die body and a fluid material dispensing outlet at said outlet face of said die body, said die body further having formed therein at least two pair of oppositely disposed fluid attenuating flow-through passages, each pair of oppositely disposed attenuating passages having a fluid attenuating inlet and fluid attenuating outlet with the oppositely disposed fluid attenuating flow-through passages being angularly disposed to define a preselected included angle of approximately one hundred and eight (108) degrees plus or minus two (2) degrees so that said fluid attenuating outlets of said opposed fluid attenuating passages are so angularly positioned on opposite sides of each of said fluid material outlets so as to provide a turbulent, pulse-like, sinusoidal attenuating fibrous flow from each of said fluid material outlets to thus increase the rate of fibrous layer attenuation, said unitary nickel chromium steel die body further having stepped recessed portions to snugly and removably receive the base portions of nickel and chromium alloyed steel nose sections, and nose sections having apex portions with a substantially triangularly shaped cross-section, said nose sections including fluid material outlet passageways communicating with said fluid material passages in said die body to form a continuing part thereof, said nose sections each having a longitudinally extending orifice plate therein adjacent the apex portion of said nose section to be in communication with said fluid material passageways to receive fluid material therefrom, said orifice plate including at least one row of spaced fibrous fluid emitting apertures therein, said spaced apertures numbering approximately thirty (30) per inch, each being preselectively sized and geometrically shaped to determine the size and cross-sectional shape of the layered fibrous material passed therethrough, said recessed portions of said die body further removably receiving longitudinally extending opposed mirror-image spaced lip sections to be spaced from and contoured to cooperate with the side flanks of said apex portion of said nose section to define fluid attenuating passageways which form part of and angularly continue the fluid attenuating passages in said die body; an aluminum alloyed, electric coil heating jacket cooperatively surrounding said unitary die to conduct heat to said passages therein; a ceramic insulating jacket cooperatively surrounding the outer face of said heating jacket; and apertured fluid treating conduits cooperative with said fluid outlets of said nose and lip sections to treat emitted layered fibrous material to enhance crystallization and to avoid subsequent bonding of collected adjacent facing fibrous layers and to reduce bonding of individual fibers within each layer to increase media bulk and filtering efficiency; and, a uniform fluid attenuating distribution assembly means, a portion of which is cooperatively positioned externally of said die body to extend longitudinally in spaced relation opposite said outlet face of said die body to cooperatively communicate with said spaced fluid attenuating passage in said die body, said distribution assembly means including an elongated internal fluid manifold disposed in said die body to communicate with said fluid material flow-through passages in said die body, said internal distribution manifold having an elongated removable fluid filter disposed therein to enhance uniform parallel flow and to separate contaminant particulates from fluid prior to passage to said flow-through passages, said portion of said distribution assembly means externally of said die body including a set of at least two parallel, spaced first manifolds connected to a common pressurized fluid source to ultimately deliver fluid to said die body at a rate of up to six hundred (600) feet per second and to be heated to a temperature of approximately nine hundred (900F) degrees Fahrenheit before dispensing through said fluid passage outlets in said die body, each of said first set of manifolds having an elongated tapered slot positioned selectively to emit said pressurized fluid uniformly therefrom, and a set of at least two elongated second manifolds externally of said die body, each spacedly surrounding said first manifolds to provide an annular mixing chamber to receive and mix fluid emitted uniformly from said tapered slots in said first manifolds, said external second manifolds being communicatively connected opposite said tapered slot to said internal fluid manifold disposed in said die body.

10. A method of distributing pressurized fiber attenuating fluid to a melt blowing die body comprising: passing pressurized fluid into a first elongated chamber externally of and opposite the fluid outlets of said melt blowing die body; distributing the pressurized fluid uniformly from said first elongated chamber into a second mixing chamber and passing said pressurized fluid to said melt blowing die body.

11. The method of distributing pressurized fiber attenuating fluid of claim 10, and filtering contaminant particulates from said pressurized fiber attenuating fluid and enhancing uniform parallel flow before said fluid passes from said melt blowing die body.

12. The method of distributing fiber attenuating pressurized fluids of claim 11, said filtering of said contaminant particulates from said fluid being accomplished in an elongated chamber within said melt blowing die body.

13. The method of distributing fiber attenuating pressurized fluids of claim 10, wherein the second mixing chamber surrounds the first chamber.

14. The method of distributing fiber attenuating pressurized fluids of claim 10, wherein said pressurized fluid is air delivered from said melt blown die body at a rate of approximately six hundred (600) feet per second at a temperature up to nine hundred (900) degrees Fahrenheit.

* * * * *